Figure 1:
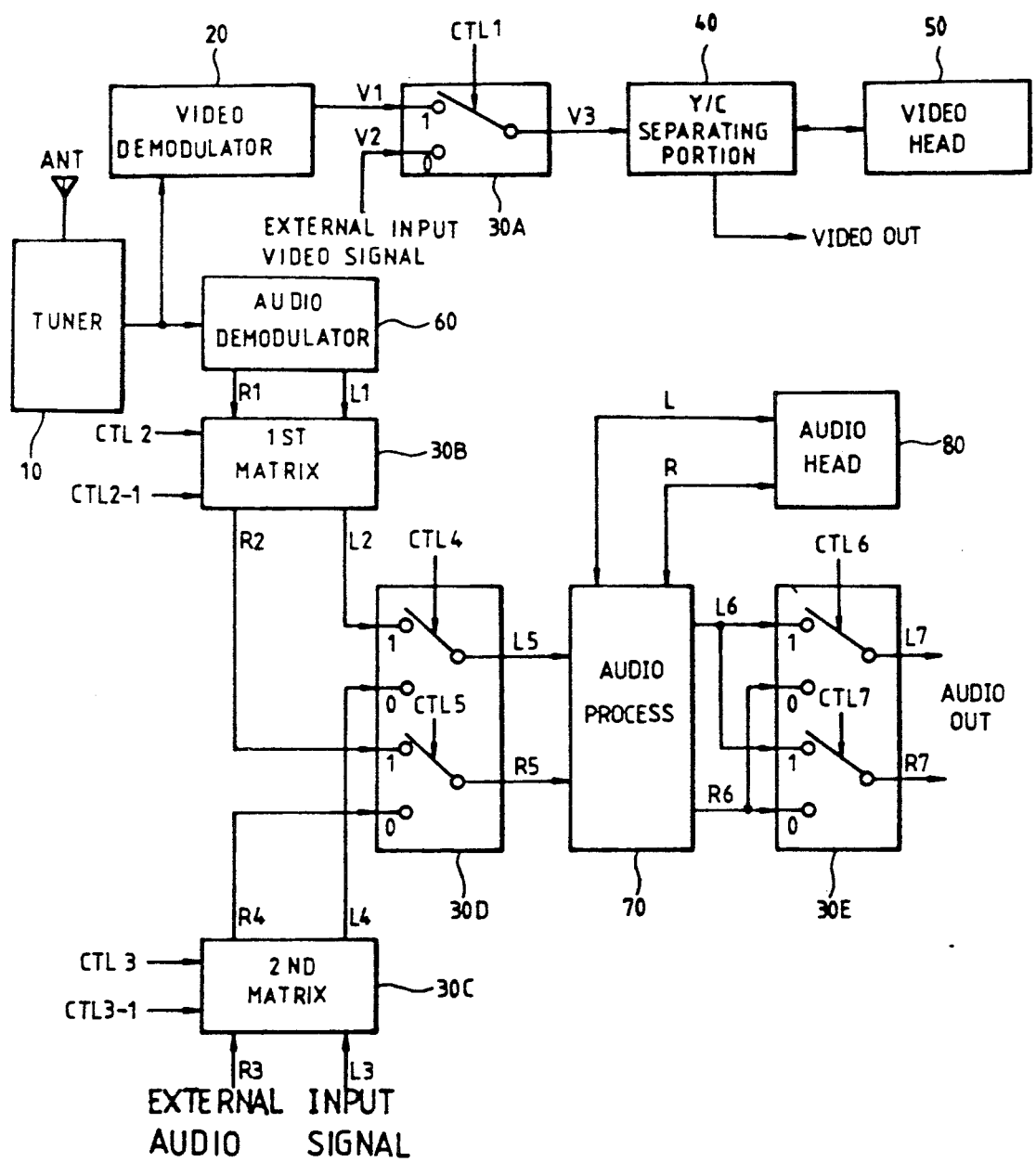

United States Patent [19]

Kim

[11] Patent Number: 5,126,981

[45] Date of Patent: Jun. 30, 1992

[54] MIXED SIMULCAST CIRCUIT

[75] Inventor: Yong-san Kim, Seoul, Rep. of Korea

[73] Assignee: SamSung Electronics Co., Ltd., Suwon, Rep. of Korea

[21] Appl. No.: 506,801

[22] Filed: Apr. 10, 1990

[30] Foreign Application Priority Data

Jun. 28, 1989 [KR] Rep. of Korea .................... 89-9666

[51] Int. Cl.⁵ .................... H04B 15/00; H02B 1/00
[52] U.S. Cl. .................................. 369/2; 381/10; 381/123; 369/5; 358/343
[58] Field of Search .................... 369/2, 1, 3, 4, 5, 91, 369/92; 381/1, 28, 10, 11, 123; 364/900; 358/343, 335, 310, 311, 341

[56] References Cited

U.S. PATENT DOCUMENTS

| | | | |
|---|---|---|---|
| 4,272,784 | 6/1981 | Saito et al. | 369/5 X |
| 4,446,488 | 5/1984 | Suzuki | 358/343 X |
| 4,490,751 | 12/1984 | Kono et al. | 358/343 X |
| 4,709,275 | 11/1987 | Fukuda | 358/343 X |
| 4,723,295 | 2/1988 | Kosaka et al. | 369/2 |
| 4,757,393 | 7/1988 | Dakin et al. | 358/343 X |
| 4,823,197 | 4/1989 | Sakata et al. | 358/343 X |
| 4,847,699 | 7/1989 | Freeman | 358/343 |

FOREIGN PATENT DOCUMENTS 0119200  6/1985  Japan ...................... 369/2

Primary Examiner—Stuart S. Levy
Assistant Examiner—Joseph A. Rhoa
Attorney, Agent, or Firm—Robert E. Bushnell

[57] ABSTRACT

A mixed simulcast circuit in which the voice signal demodulated in the voice demodulator through the tuner and the voice signal from the outside can be recorded on the recording medium according to the user's desire, then reproduced selectively. The mixed simulcast circuit has first means for recording a signal which is received in the tuner and demodulated in the demodulator, second means for recording the modulated voice signal on the one channel of the recording medium and for recording the voice signal from the external on the other channel thereof, and means for switching selectively one signal, either the voice signal which is demodulated and recorded from tuner or the voice signal, which is recorded from the external, when it reproduced.

5 Claims, 2 Drawing Sheets

FIG. 2A

| MODE | CTL1 | V3 |
|---|---|---|
| TUNER | 1 | V1 |
| SIMULCAST | 1 | V1 |
| MIXED SIMULCAST | 1 | V1 |
| LINE | ø | V2 |

FIG. 2B

| STATUS / OUTPUT | BILINGUAL | | STREO | | MONO | |
|---|---|---|---|---|---|---|
| CTL 2 / 2-1 | L2 | R2 | L2 | R2 | L2 | R2 |
| 1 | 1 | R1 | R1 | L1 | R1 | L1+R1 | L1+R1 |
| 1 | ø | L1 | R1 | L1 | R1 | L1+R1 | L1+R1 |
| ø | ø | L1 | L1 | L1+R1 | L1+R1 | L1+R1 | L1+R1 |

FIG. 2C

| CTL3 / 3-1 / OUTPUT | L4 | R4 |
|---|---|---|
| 1 | 1 | L3 | R3 |
| 1 | ø | R3 | L3 |
| ø | ø | L3+R3 | L3+R3 |

FIG. 2D

| MODE / OUTPUT | CTL4 | CTL5 | L5 | R5 |
|---|---|---|---|---|
| TUNER | 1 | 1 | L2 | R2 |
| SIMULCAST | ø | ø | L4 | R4 |
| MIXED SIMULCAST | 1 | ø | L2 | R4 |
| LINE | ø | ø | L4 | R4 |

FIG. 2E

| CTL6 / 7 / OUTPUT | L7 | R7 |
|---|---|---|
| 1 | 1 | L6 | L6 |
| 1 | ø | L6 | R6 |
| ø | ø | R6 | R6 |

FIG. 2F

| CTL SIGNAL | LOGIC VALUE |
|---|---|
| CTL 1 | 1 |
| CTL 2 | 1 |
| CTL 2-1 | 1 |
| CTL 3 | ø |
| CTL 3-1 | ø |
| CTL 4 | 1 |
| CTL 5 | ø |

# MIXED SIMULCAST CIRCUIT

BACKGROUND OF THE INVENTION

This invention relates to a mixed simulcast circuit in which is video recorder/reproducers which is adapted to record and reproduce video and voice signals by using magnetic tape and, more particularly, to the mixed simulcast circuit in which the voice signal received through a tuner and demodulated in the voice demodulating portion, and the voice signal from the outside can be recorded on the recording medium according to the user's desire, then reproduced selectively.

Generally, when the simulcasting mode is set in the video recorder/reproducer having a simulcast circuit, the video signal is recorded on a recording medium such as the magnetic tape with the video signal demodulated in the video demodulating portion through the tuner, while the voice is recorded on the recording medium with the voice signal input from the outside. Therefore, the voice signal during reproduction reproduces only the voice signal input from the outside.

Conventionally, when the simulcasting mode is selected, the video signal is demodulated in the video recorder/reproducer, and then recorded on the recording medium, and the voice signal which is input from outside is recorded thereon. Accordingly, since the voice signal is limited to only a signal input from the outside, there is a problem that the voice signal output from the voice demodulator in the video recorder/reproducer when the simulcasting mode is selected can not recorded.

SUMMARY OF THE INVENTION

The object of the present invention is to provide a mixed simulcast circuit comprising a stage for recording the video signal which is received in the tuner and demodulated in the video demodulator; a device for recording the modulated voice signal on the one channel of the recording medium and for recording the voice signal which is input from outside on the other channel thereof; and a device for switching selectively one of the voice signals which is intended to listen.

The above and other objects and features of the invention will become more apparent from the detailed description referring to the accompanying drawings in which.

FIG. 1 is a schematic block diagram for illustrating the mixed simulcast circuit according to the present invention; and FIG. 2(a) to (2f) are logic tables for explaining the operation of each switching portion in FIG. 1.

The mixed simulcast circuit according to the present invention is as shown in FIG. 1.

Referring to FIG. 1, it will be seen that an RF signal applied to tuner 10 through an antenna ANT is changed to an IF signal of desired channel, then supplied to a video demodulator 20 and a voice demodulator 60, respectively.

The first switching portion 30A outputs selectively one signal which is either the video signal from the video demodulator 20 according to the control signal CTL 1 or the voice signal supplied from the outside, and records it on the magnetic tape through a Y/C separating portion 40 and a video head 50.

The second switching portion 30 B is constructed so that the left and right channel voice signals L1 and R1 are output as the desired signal by switching by means of the control signals CTL 2 and CTL 2-1, while the third switching portion 30C is constructed so that the voice signals L3 and R3 from the outside are output to the desired signal by switching by means of the control signals CTL3 and CTL 3-1.

In the fourth switching portion 30D, signals L2 and R2, L4 and R4 from the second and third switching portion 30B and 30C are selected by control signals CTL 4 and CTL 5 and recorded on the magnetic tape depending upon the recording or reproducing mode, or output to the outside through the fifth switching portion 30E to be described later.

The fifth switching portion 30E is constructed so that the voice signals L6 and R6 from the audioprocessor 70C are output by switched by means of the control signals CTL 6 and CTL 7.

The operation of the mixed simulcast circuit according to the present invention having the above-referred construction will be described in connection with the logic table shown in FIG. 2.

In the mixed simulcast circuit shown in FIG. 1, the RF signal applied to the tuner 10 through the antenna ANT is changed to the IF signal of the desired channel and applied to the video demodulator 20 and the voice demodulator 60, respectively.

The IF signal applied to the video demodulator 20 is demodulated to the video signal V1 and supplied to one terminal of the first switching portion 30A, while the video signal from the outside is supplied to the other terminal thereof.

Therefore, the video signal from the first switching portion 30A is determined by the control signal CTL 1 as the logic table shown in FIG. 2a.

Referring now to FIG. 2a, if the control signal CTL 1 is "high", the video signal V1 from the video demodulator 20 is applied to the Y/C separating portion 40, while if the control signal CTL 1 is "low", the outside input signal V1 is selected and applied to the Y/C separating portion 40, so that it is recorded on the magnetic tape through the video head 50.

Accordingly, the video signal recorded on the magnetic tape is picked up by the video head 50 when it is the reproducing mode and output to the outside through the Y/C separating portion 40.

Then, the left and right channel voice signals L1 and R1 demodulated in the voice demodulator 60 are applied to the second switching portion 30B and selected to the desired signals L2 and R2 as shown the logic table of FIG. 2b, and the outside input voice signals L3 and R3 supplied to the third switching portion 30C are selected to the desired signals L4 and R4 by the control signals CTL3 and CTL3-1 as shown in the logic table of FIG. 2(C), then supplied to the fourth switching portion 30D for a input selection, respectively.

As described above, the output signals L2, R2 and L4, and R4 selected from the first and second switching portions 30B and 30C are applied to each input stage of the fourth switching portion 30D. At this time each output signal is selected by the control signals CTL 4 and CTL 5, and is applied to the audioprocessor 70 of the voice processing block, so that it is recorded on the magnetic tape through the audiohead 80 or output to the outside through the fifth switching portion 30E.

The L5 of signals output selectively from the fourth switching portion 30D is the recording input signal of the left channel, while R5 is the recording input signal of the right channel.

At this time, the signal being selected by the control signals CTL 4 and CTL 5 is as shown in the logic table of FIG. 2d. That is, the output signal output selectively by the control signal CTL 4 from the fourth switching portion 30D results in voice signals L2 and R2, and in the simulcast mode or line mode both left and right modes results in the external signals L4, R4 selected from the third switching portion 30C.

If the mixed simulcast mode is set, the control signal CTL 4 becomes "high" and CTL 5 becomes "low", so that the output signal L5 results in the tuner voice signal L2 from the second switching portion 30B, while the output signal R5 becomes the external voice signal R4 from the third switching portion 30C.

Thereafter, said voice signals L5 and R5 selected from the fourth switching portion 30D are output as the voice signal L6 and R6 through auto level limiting circuit in audio processor 70 which serves as the voice processing block and recorded on the magnetic tape by means of the left and right audio head.

Thus, in the reproduction mode, the voice signal of the left and right channel recorded on the magnetic tape through said processes is picked up at left and right head and is output as the voice signals L6 and R6 through the audio processor 70.

The voice signals L6 and R6 from the audio processor 70 are supplied to the fifth switching portion 30E of which output is determined as shown in FIG. 2(E) by the control signals CTL 6 and CTL 7, and output as the voice signals L7 and R7.

The operation of the simulcast mode according to the present invention will be explained.

During the multivoice broadcasting, if it is intended to record a foreign language while concurrently recording the external input signals L3, R3 each control signal shown in FIG. 2(F) is from a microcomputer which is not shown in the drawing and is supplied to each switching portion.

That is, if the control signal CTL 1 supplied to the first switching portion 30A is "high", the voice signal therefrom is recorded on the magnetic tape as the tuner video signal V1 demodulated in the video demodulator 20.

Also, if the control signals CTL2, CTL2-1 supplied to the second switching are "high" together, the right channel is selected as shown in FIG. 2(b), so that the foreign language is output as the voice signal L2. In FIG. 2(B), L1 indiates the vernacular language.

At this time, if the control signals CTL3 and CTL3-1 supplied to the third switching portion 30C are "low" together, the external voice signals of R3+L3 are output as the voice signal R4 as shown in FIG. 2(C).

Thus, the external input voice signal L3+R3 and the voice signal L2 of the foreign language switched and output at the second and third switching portions 30B, and 30C are supplied to the fourth switching portion, then output as shown in FIG. 2(d) by the control signal CTL, CTL5.

If the control signal CTL4 supplied to the fourth switching portion is "high", the voice signal L2 of foreign language from the second switching portion 30B is selected, if the control signal CTL5 is "low", the voice signal R3 of the external input voice signal L3+R3 outputted from the third switching portion 30C is selectively.

As mentioned above, in the mixed simulcasting mode the video is recorded with the video signal of the tuner, and the voice is recorded on one channel with the voice signal demodulated at the voice demodulating portion, while concurrently recorded on the other channel with the external input voice signal L3+R3.

As mentioned above, if the signal recorded based on the mixed simulcasting mode is intended to reproduce, the foreign language signal is provided as the voice signal L6 from the audio processor 70, and the external input voice signal of L3+R3 is provided as the voice signal R6, and then applied to the fifth switching portion 30E, so that the output voice signal can be heard according to the control signal CTL 6 and CTL 7.

The present invention has an advantage in that when the simulcasting mode is set, since the video signal demodulated in the video modular is recorded on the magnetic tape, and the voice signal demodulated in the voice demodulator and the external input voice signal are concurrently recorded on the each channel of the magnetic tape, the user can listen selectively to the voice signal from the tuner or the external source.

What is claimed is:

1. A mixed simulcast circuit, comprising:
   first switching means for receiving video signals supplied through a tuner and a first external source, and for selectively recording onto or reproducing from a magnetic tape in accordance to a first control signal, either one of said video signals supplied through the tuner and the first external source;
   audio processor means for receiving audio signals supplied through the tuner and a second external source, and for selectively recording onto and reproducing from said magnetic tape in accordance to a plurality of control signals, selected ones of said audio signals supplied through the tuner and second external source, said audio processor means comprising:
   second switching means for matrixing a left channel audio and a right channel audio signal from said tuner in accordance with second control signals;
   third switching means for matrixing a left channel audio and a right channel audio signal from said external source in accordance with third control signals; and
   fourth switching means for selecting one of the audio signals supplied from said second switching means and one of the audio signals supplied from said third switching means in accordance with fourth control signals.

2. A mixed simulcast circuit for simultaneously receiving a first composite signal having audio and video components from a radio frequency signal through an internal tuner, a video demodulator, and an audio demodulator, for processing said audio components into a right channel audio signal and a left channel audio signal, and for receiving a second composite signal having audio and video components from an external source, said audio component having a right channel audio signal and a left channel audio signal, comprising:
   video processor means having a switch for providing a selected video component by selecting either one of the video components of said first composite signal and the video components of said second composite signal in accordance with a first control signal, components of the selected video signal, and a video head for recording and reproducing said separated components of the video signal;

audio processor means comprising:
- a first switch for receiving said audio component of said first composite signal and selecting between said right channel audio signal and said left channel audio signal in accordance with second control signals to provide a first pair of audio intermediate signals;
- a second switch for receiving said audio component of said second composite signal and selecting between said right channel audio signal and said left channel audio signal in accordance with third control signals to provide a second pair of audio intermediate signals;
- a third switch for selecting between said first and second pair of audio intermediate signals in accordance with fourth control signals to provide a third pair of audio intermediate signals; and
- an audio processor for receiving said third pair of audio intermediate signals for processing said third pair of audio intermediate signals in a plurality of recording and reproducing modes to generate a fourth pair of audio intermediate signals for an audio head to enable recording and reproducing of said fourth pair of audio intermediate signals.

3. The mixed simulcast circuit as claimed in claim 2, wherein said plurality of recording and reproducing modes are a tuner mode, a simulcast mode, a mixed simulcast mode and a line mode.

4. The mixed simulcast circuit as claimed in claim 3, wherein during a mixed simulcast mode, the third switch selects one audio intermediate signal from each of said first and second pair of audio intermediate signals.

5. The mixed simulcast circuit as claimed in claim 3, wherein during a simulcast mode, the third switch selects both audio intermediate signals from said second pair of audio intermediate signals.

* * * * *

UNITED STATES PATENT AND TRADEMARK OFFICE
CERTIFICATE OF CORRECTION

PATENT NO. : 5,126,981
DATED : 30 June 1992
INVENTOR(S) : Yong-san KIM

It is certified that error appears in the above-indentified patent and that said Letters Patent is hereby corrected as shown below:

Column 1,    Line 6,    delete "which is " in both occurrences;

Line 18,    before "magnetic", delete "the";

Line 48,    after "which" , change the comma to --:--;

Column 3    Line 66,

"selectively", insert --outputted--:

Signed and Sealed this

Thirteenth Day of August, 1996

*Attest:*

BRUCE LEHMAN

*Attesting Officer*    *Commissioner of Patents and Trademarks*